No. 607,829. Patented July 26, 1898.
W. M. CAREY.
UNICYCLE.
(Application filed Aug. 7, 1896.)
(No Model.) 2 Sheets—Sheet 1.
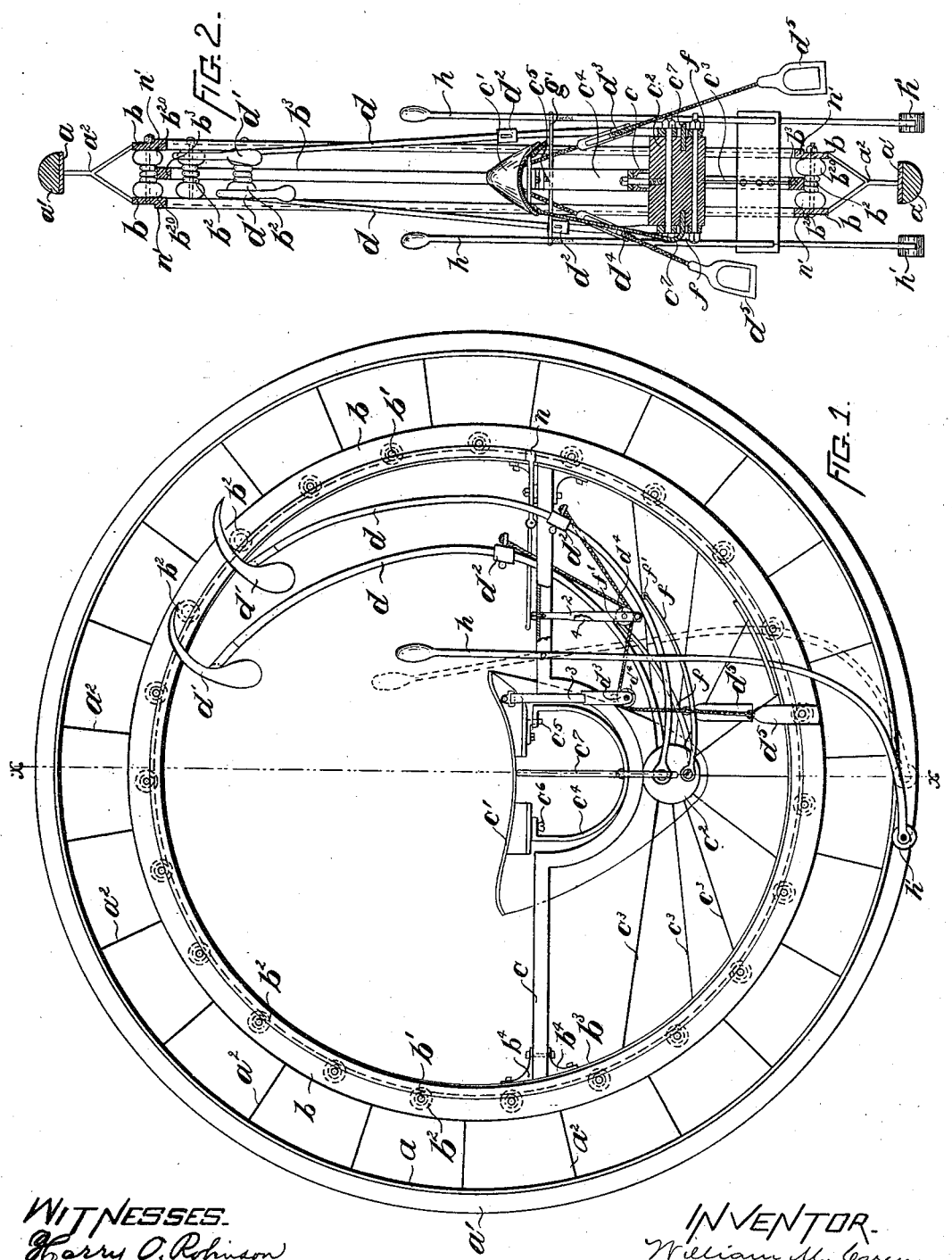

No. 607,829. Patented July 26, 1898.
W. M. CAREY.
UNICYCLE.
(Application filed Aug. 7, 1896.)
(No Model.) 2 Sheets—Sheet 2.
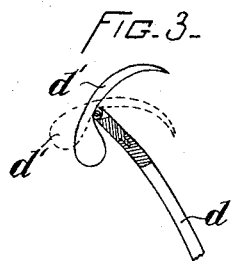
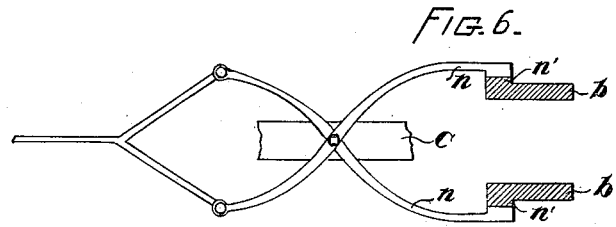
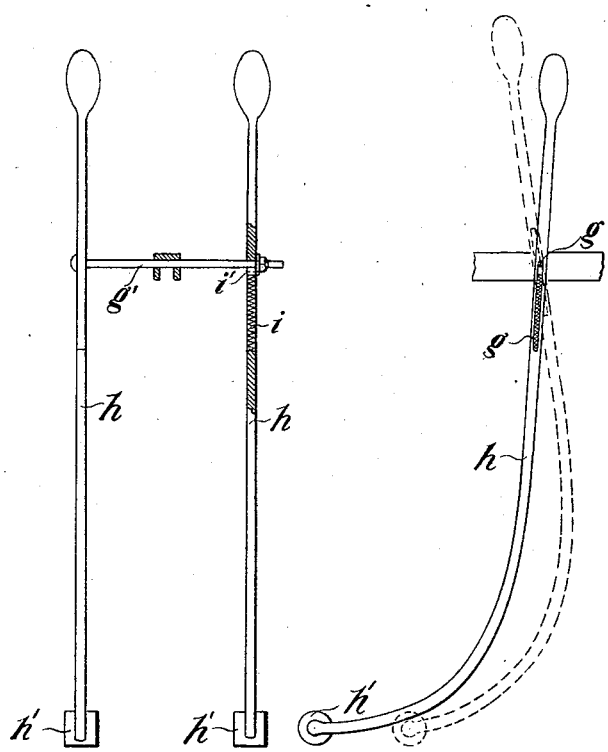
WITNESSES.
Harry O. Robinson.
F. H. Davis.
INVENTOR.
William M. Carey,
by B. J. Hayes,
atty.

UNITED STATES PATENT OFFICE.

WILLIAM M. CAREY, OF BOSTON, MASSACHUSETTS.

UNICYCLE.

SPECIFICATION forming part of Letters Patent No. 607,829, dated July 26, 1898.

Application filed August 7, 1896. Serial No. 602,077. (No model.)

*To all whom it may concern:*

Be it known that I, WILLIAM M. CAREY, of Boston, county of Suffolk, State of Massachusetts, have invented an Improvement in Unicycles, of which the following description, in connection with the accompanying drawings, is a specification, like letters and figures on the drawings representing like parts.

This invention has for its object to construct an improved unicycle of that class wherein the rider is seated and works within a large open-centered wheel, and comprehends a large open-centered wheel comprising an outer rim and tire thereon and an inner ring-like structure or frame rigidly connected with said outer rim by radial spokes.

The inner ring-like structure or frame is composed of two flat rings located side by side and separated a short distance and secured together by a number of transverse rods or bars, upon which rolls are mounted.

Within the open-centered wheel and between the flat rings forming the ring-like structure or frame thereof a circular supporting-frame is arranged, it resting upon rolls mounted on the transverse rods or bars. A cross-piece is arranged diametrically within said circular supporting-frame a short distance below its center, being secured at its ends, and substantially midway its length it has a depressed portion, in which the seat or saddle is placed. A hub is supported directly beneath said depressed portion of the cross-bar, and a number of spokes radiate from said hub to and connect it with the circular supporting-frame. The saddle, which may be made in any desirable way, is supported in the depressed portion of said cross-bar.

The propelling mechanism comprises, essentially, two spring-actuated arms pivotally connected at their lower ends to said hub and extended upwardly, one at each side of said circular supporting-frame, and provided at their upper extremities with gripping or clutching devices adapted to engage rolls on the transverse bars of the open-centered wheel, and said spring-actuated arms have secured to them cords or straps or equivalent flexible connections, to which stirrups are attached, adapted to be operated by the feet of the rider.

The steering device comprises, essentially, two steering-arms arranged one at each side of the machine, the operating levers or handles of which are located within easy reach of the rider and the lower ends of which bear upon the ground a short distance at the rear of the point of contact of said large open-centered wheel with the ground, and pressure applied to one of said steering-arms causes said unicycle to change its course. These steering-arms are also constructed and arranged to serve as steadying devices or supports for the machine when mounting or dismounting.

As a brake for the machine I may employ a pair of jaws which when operated will frictionally engage the ring-like structure or frame.

Figure 1 is a side elevation of a unicycle embodying this invention. Fig. 2 is a vertical section of the same, taken on the dotted line $xx$, Fig. 1. Fig. 3 is a detail showing the gripping or clutching device on one of the actuating-arms. Figs. 4 and 5 are front and side elevations of the steering-arms, showing their pivotal connection with the circular supporting-frame. Fig. 6 is a plan view of the brake with the jaws in engagement with the open-centered wheel.

The large wheel is composed of the outer rim $a$ and tire $a'$ thereon and an inner ring-like structure or frame rigidly connected with said outer rim $a$ by radial spokes $a^2$, which are preferably bifurcated, as shown in Fig. 2, but in lieu thereof they may be made straight and to alternately radiate from either side of the ring-like structure or frame to the outer rim $a$. The inner ring-like structure or frame is composed of two flat rings $b\ b$, located side by side and separated a short distance and rigidly secured together by a number of transverse rods or bars $b'$, upon each of which small rolls $b^2$ and large rolls $b^{20}$ are mounted and free to revolve, there being herein shown two large rolls on each bar and a small roll between them. Thus a large open-centered wheel is produced. A circular supporting-frame having as an essential part of it a circular rim $b^3$ is contained within said large open-centered wheel between the flat rings $b\ b$, it resting upon the small rolls $b^2$, which are mounted on the transverse bars $b'$, between the large rolls $b^{20}$. The rim $b^3$ thus supported has small rolls $b^2$ for a face-bearing and large rolls $b^{20}$ for side bearings. A cross-piece $c$ is arranged diametrically across said circular rim $b^3$ a short distance below its center, being secured at its ends to said rim $b^3$ by brackets $b^4$, as shown in Fig. 1, and said crosspiece $c$ has substantially midway its length a depressed or U-shaped portion in which the seat or saddle $c'$ is placed. A hub $c^2$ is located directly beneath said depressed or U-shaped portion of the cross-piece $c$ and is held in fixed position within and relatively to the circular supporting-frame by a bolt which passes through said depressed portion of the crosspiece $c$ and into said hub $c^2$ and by a number of spokes $c^3$, which radiate from said hub and connect it with said rim $b^3$.

The saddle, which may be made in any desirable way, is supported by a bowed or U-shaped spring $c^4$, held in upright position and secured within the depressed portion of the cross-piece, it being attached to the front end of said saddle by a hook $c^5$, which passes through a hole in a horizontal ear formed upon said bowed spring, and to the rear end of said saddle by a thumb-nut $c^6$, which passes through a like horizontal ear formed upon said bowed spring and into a plate secured to the bottom of said saddle, and two lateral springs $c^7$ are also secured to said hub $c^2$, which projects upwardly therefrom to said saddle, being secured thereto and aiding in supporting it.

The propelling mechanism comprises, essentially, two spring-actuated arms $d\ d$, pivotally connected at their lower ends to said hub $c^2$ and extending upwardly, one at each side of said circular supporting-rim $b^3$, and at the upper extremities of said arms gripping or clutching devices are provided, consisting, as herein shown, of curved or hooked fingers $d'\ d'$, pivotally connected to the ends of the arms and adapted to engage the rolls $b^{20}$, mounted on the transverse bars of the open-centered wheel at each side of the rolls $b^2$, and said spring-actuated arms have adjustably secured to them cord or strap holding devices, consisting of blocks $d^2\ d^2$, which embrace the arms and are made adjustable thereon. A set of pulleys $d^3\ d^3$ are supported by depending brackets 2 3 on the cross-piece $c$ and saddle, and a similar set of pulleys $d^4\ d^4$ are supported by depending brackets 4 5 on the cross-piece $c$ and saddle at the opposite side of the machine, and cords or straps or equivalent flexible connections are attached to said cord or strap holding devices $d^2\ d^2$, which pass over said pulleys $d^3\ d^3$ and $d^4\ d^4$ and have attached to their opposite or free ends stirrups $d^5$, which are constructed and arranged to be operated by the feet of the rider. The gripping or clutching fingers $d'\ d'$, secured to the spring-actuated arms $d\ d$, engage the rolls $b^{20}$, mounted upon the transverse rods or bars $b'$ of the large open-centered wheel, and as the rider depresses the stirrups $d^5\ d^5$ alternately first one and then the other spring-actuated arm will be depressed, and the gripping or clutching fingers $d'\ d'$, secured to the ends of said arms $d\ d$, will engage the rolls $b^{20}$ or bars $b'$ and cause said large open-centered wheel to revolve. Two spring-arms $f\ f$ are rigidly secured to said hub $c^2$, which project forwardly beneath the arms $d\ d$ and bear at their ends friction-rolls $f'\ f'$, which bear upon or against said arms $d\ d$. When said arms $d\ d$ are depressed, they act upon or against the spring-arms $f\ f$, and when the pressure upon the arm is relieved said spring-arms $f\ f$ will act to lift said arms $d\ d$, that the gripping or clutching fingers $d'\ d'$ will engage the rolls on another bar. When said arms $d\ d$ are rising, in order that the gripping or clutching fingers $d'\ d'$ thereon may engage the rolls to prevent said fingers from interfering with the motion of said open-centered wheel by striking against the rolls I pivot said fingers $d'\ d'$ to said arms $d\ d$, so that they are free to be turned forwardly on their pivots, but are prevented from turning rearwardly, (see Fig. 3,) and said fingers $d'\ d'$ are weighted, or in lieu thereof they may be spring-pressed.

The steering device herein shown comprises, essentially, two steering-arms $h\ h$, pivoted to the cross-piece $c$ by a rod which passes through them and through said cross-piece $c$, and said arms are arranged one at each side of the machine and have hand-engaging portions located within easy reach of the rider, and the lower ends of said steering-arms $h\ h$ bear upon the ground a short distance at the rear of the point of contact of said large open-centered wheel with the ground, and pressure applied to either one of said steering-arms causes the machine to change its course. Said steering-arms may, if desired, be provided at their lower ends with rolls $h'\ h'$, which bear upon the ground. These steering-arms $h\ h$ are also used when the rider wishes to dismount in steadying the machine, and so they are arranged in such manner that their lower ends may be brought forward to bring the rolls $h'\ h'$ opposite the point of contact of the large open-centered wheel and the ground, and to compensate for the variation in radius from their pivotal connection to the cross-piece $c$ and the ground at the point of contact therewith of the large open-centered wheel said steering-arms are slotted at $g$, (see Figs. 4 and 5,) and a spiral spring $i$ is placed in said slot, having secured to its upper end a block $i'$, which bears firmly against the rod $g'$. When the lower ends of said steering-arms $h\ h$ are brought forward, as shown by dotted lines, Figs. 1 and 4, the slot $g$, formed in them, allows sufficient vertical adjustment of said arms to compensate for the variation in radius as they are moved from one position to the other, and said spiral springs also firmly hold said arms in place.

As a brake for the machine I may employ a pair of jaws $n$, (see Fig. 6,) which when operated will frictionally engage the flat rings $b\ b$ of the large open-centered wheel, and in such case a flange $n'$ may be formed upon the rings b b of said wheel, against which the jaws n of said brake bear. Said brake may be secured to and thus supported by the crosspiece c, and a strap may be attached to the rear ends of its jaws, as shown in Fig. 6, which extends along said cross-bar c to be within easy reach of the rider to be manipulated by him to operate the brake.

It is obvious that the construction of many of the features herein shown may be somewhat changed without departing from this invention, and, furthermore, some of them may even be omitted or used in combination or connection with other features, and hence I do not desire to limit the invention to the employment of all the features shown.

I claim—

1. In a unicycle, the combination of a large open-centered wheel comprising a rim and tire thereon, and an inner ring-like structure rigidly connected with said rim by radial spokes, said ring-like structure consisting of two rings rigidly connected together by transverse bars arranged at regular intervals, a supporting-frame contained within and supported by said ring-like structure, two actuating-arms borne by it having at their extremities gripping or clutching devices adapted to engage said transverse bars, means for operating said arms, and a seat also supported by said frame, substantially as described.

2. In a unicycle, the combination of an open-centered wheel having transverse bars arranged at intervals around the interior thereof, of two actuating-arms having at their extremities gripping or clutching devices adapted to engage said transverse bars, stirrups, and flexible connections connecting them with said arms for operating them, and springs acting upon said arms to restore them, substantially as described.

3. In a unicycle, the combination of a large open-centered wheel having transverse bars arranged at intervals around the interior thereof, two actuating-arms b, b, having at their extremities pivoted counterbalanced claws b', b', and stops therefor, and means for operating said actuating-arms, substantially as described.

4. In a unicycle, the combination of a large open-centered wheel comprising a rim and tire thereon, and an inner ring-like structure connected with said outer rim by radial spokes and consisting of two flat rings located side by side and separated a short distance and secured together by transverse rods or bars, and propelling mechanism comprising two spring-actuated arms bearing gripping or clutching devices constructed and arranged to engage said bars, and means for operating said arms, substantially as described.

5. In a unicycle, a large open-centered wheel having transverse bars arranged at intervals around the interior thereof, each bar having mounted upon it a pair of large rolls and one or more small rolls between them, and an independent circular supporting-frame contained within said open-centered wheel, the rim of which occupies a position between said large rolls and bears upon said small rolls, substantially as described.

6. In a unicycle, the combination of a large open-centered wheel, a supporting-frame within it and steering devices supported thereon, consisting of two downwardly-extended arms each having a longitudinal slot or aperture formed therein, a pivot-pin passing therethrough, and a spiral spring contained in said slot or aperture having at its upper end a block which bears upon said pivot-pin, substantially as described.

In testimony whereof I have signed my name to this specification in the presence of two subscribing witnesses.

WM. M. CAREY.

Witnesses:
B. J. NOYES,
HARRY O. ROBINSON.